(12) United States Patent
Sirhall

(10) Patent No.: US 6,922,814 B2
(45) Date of Patent: Jul. 26, 2005

(54) SOFTWARE TOOL FOR CREATING AN INTERACTIVE IMAGE DRAG DROP

(75) Inventor: Thomas M. Sirhall, Littleton, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 804 days.

(21) Appl. No.: 09/823,610

(22) Filed: Mar. 30, 2001

(65) Prior Publication Data

US 2002/0180770 A1 Dec. 5, 2002

(51) Int. Cl.$^7$ ................................ G06F 3/14; G09B 7/04
(52) U.S. Cl. ....................... 715/769; 715/749; 715/780; 434/323; 434/322
(58) Field of Search ................................ 434/322, 323, 434/324, 327, 335, 118; 345/769; 715/769, 760, 780, 809, 808, 749, 748, 733

(56) References Cited

U.S. PATENT DOCUMENTS

| | | | |
|---|---|---|---|
| 5,584,699 A | * 12/1996 | Silver | 434/322 X |
| 6,347,943 B1 | * 2/2002 | Fields et al. | 434/118 |
| 6,435,880 B1 | * 8/2002 | Tsumori et al. | 434/323 |
| 2001/0051330 A1 | * 12/2001 | Futakuchi | 434/322 |
| 2001/0053000 A1 | * 12/2001 | Kim | 358/1.18 |

* cited by examiner

Primary Examiner—Raymond J. Bayerl
(74) Attorney, Agent, or Firm—Lahive & Cockfield, LLP

(57) ABSTRACT

An interactive software tool for testing a user in a web-based learning environment. The interactive software tool is embedded in a course page of a web-based curriculum. The software tool provides a question to a user regarding the information presented in the course, and an answer box containing a plurality of correct and incorrect answers. The software tool instructs the user to select at least one answer to the question. The software tool provides feedback to the user, and allows the user to revise an incorrect answer selection.

24 Claims, 8 Drawing Sheets

Self✓check

| Question: | Build the order of the OSI Network Model layers by dragging the bars into their proper position. |
|---|---|

The OSI Network Model
- Transport Layer
- Presentation Layer
- Session Layer
- Network Layer
- Data Link Layer
- Physical Layer
- Application Layer Incorrect. Please reconfigure your selections. 2 are correct.

20

19  21

[Check] [Reset]

*Fig. 6*

SOFTWARE TOOL FOR CREATING AN INTERACTIVE IMAGE DRAG DROP

FIELD OF THE INVENTION

The present invention relates to a web-based learning environment. More particularly, the present invention relates to an interactive software tool for testing a user from a remote location.

BACKGROUND OF THE INVENTION

The Internet has revolutionized educational opportunities by accommodating on-line educational courses. On-line educational courses can provide a diverse educational curriculum without imposing long-distance travel on students. Furthermore, on-line educational courses accommodate students with a wide variety of lifestyles, provide learning at an appropriate pace for a student and can accommodate a student's time constraints. A student may enroll in a periodic on-line educational course to learn about a new technology or other subject of interest without disrupting participation by the student in other activities, such as a full-time jobs or activities with their family.

However, a drawback of current learning opportunities over the Internet is the difficulty in testing a student. In the traditional classroom setting, testing has proven to be extremely beneficial to the learning process of a student. Testing helps assess a student's retention and absorption of presented information and allows an instructor to chart a student's progress through the learning process. Testing also serves to reinforce and emphasize the presented information in the mind of the student. Testing further provides feedback to an instructor or course creator regarding the clarity and comprehensiveness of the material presented. Without an effective testing process, a distance-learning student may be merely a passive viewer of information, rather than an active participant in the educational process.

SUMMARY OF THE INVENTION

The present invention provides an interactive software application for testing a user's knowledge in a web-based learning environment. According to an illustrative embodiment, the present invention provides an interactive software tool embedded in a course page of a web-based curriculum. The software tool provides a question to a user regarding the information presented in the course and instructs the user to provide an answer to the question. The software tool provides feedback to the user, and allows the user to revise an incorrect answer.

According to one embodiment of the present invention, a method is provided for use in an electronic device that provides an on-line educational course. The method includes the steps of providing an interactive image-drag-drop software tool and forwarding the image-drag-drop software tool from the electronic device to a remote client. The software tool generates a graphical user interface displaying a question, a plurality of answer selections and a plurality of answer regions to a user to allow the user to drag each answer selection of the plurality of answer selections to a unique answer region of the plurality of answer regions.

According to another embodiment of the present invention, a method is provided for use in an electronic device that provides an on-line educational course. The method includes the steps of receiving a request for a Web page at the electronic device from a remote client and in response to the receiving step, sending a Web page containing a question and an image-drag-drop software tool embedded therein to the remote client. The image-drag-drop software tool generates a graphical user interface (GUI) including instructions to a user to enter a correct response to the question provided by the Web page.

A further embodiment of the invention involves a computer-readable medium for use in an electronic device that provides an on-line educational course. This embodiment includes instructions for running an image-drag-drop software tool for displaying a question, a plurality of answer selections and a plurality of answer regions to a user to allow the user to drag each answer selection of the plurality of answer selections to a unique answer region of the plurality of answer regions to form a proper response to the question.

Another embodiment of the invention involves an electronic device for providing an on-line educational course including a processor, a display screen and memory including a Web page having an interactive image-drag-drop software tool embedded therein. The processor executes the image-drag-drop software tool to generate a graphical user interface on the display screen, the graphical user interface displaying a question, a plurality of answer selections and a plurality of answer regions to a user to allow the user to drag each answer selection of the plurality of answer selections to a unique answer region of the plurality of answer regions to form a proper response to the question.

BRIEF DESCRIPTION OF THE DRAWINGS

The foregoing and other objects, features and advantages of the invention will be apparent from the following description and the accompanying drawings, in which like reference characters refer to the same parts throughout the different views. The drawings illustrate principles of the invention and, although not to scale, show relative dimensions.

FIG. 3 illustrates a web page including the image-drag-drop software tool of the illustrative embodiment of the present invention.

FIG. 4 illustrates an example of a user interface when a user matches an image with a corresponding description.

FIG. 6 illustrates an example of the user interface after the user has incorrectly matched the images with the descriptions.

DETAILED DESCRIPTION OF A PREFERRED EMBODIMENT

Figure 1:
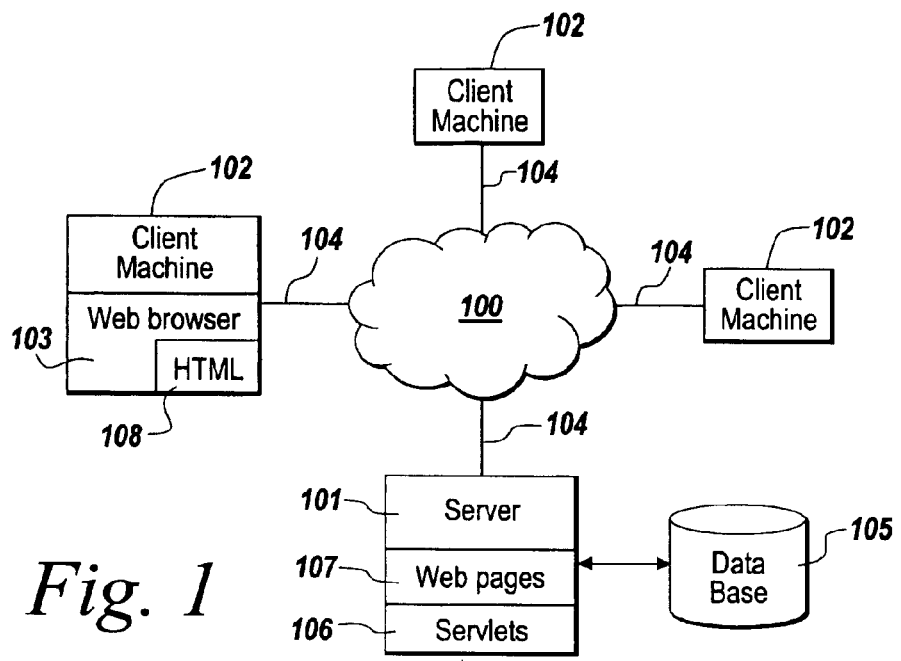
FIG. 1 is a block diagram of network hardware suitable for implementing an on-line educational course and running the image-drag-drop software tool of an illustrative embodiment of the present invention.

FIGS. 1 through 9, wherein like parts are designated by like reference numerals throughout, illustrate an example embodiment of a software application suitable for interacting with a user to test the user on information presented in an on-line educational course. Although the present invention will be described with reference to an illustrative embodiment shown in the figures, those skilled in the art will appreciate that the present invention may be implemented in a number of different applications and embodiments and is not specifically limited in its application to the particular embodiment depicted herein.

The software application of the present invention provides a mechanism by which a provider of an on-line network learning center can test a student on information presented in an on-line education course setting of an on-line network learning center environment. An "on-line network learning center" is an organization that provides instruction over a wired and/or wireless communication network, such as the Internet, an intranet, an extranet, a local area network (LAN) and a wide area network (WAN) and other networks enabling communication among computers. An on-line network learning center maintains a server having a domain name associated with the learning center. Administrators of the learning center develop, create, edit and/or administer an on-line educational course. An "on-line educational course" is curriculum, such as a training course for a new technology, that is delivered to a student over a wired and/or wireless communication network as described above. Course material in the on-line educational course may consist of many units or chapters and may include text, graphics, sound, movies and exercises to be performed by the student. Through the use of the software application, an image-drag-drop software tool, the student is presented with a question related to the information presented in an on-line course, followed by a text field for entering an answer. The software tool provides feedback to the student informing the student if he has correctly answered the question. If the student is incorrect, the software tool invites the student to try again. After a predetermined number of attempts, the software tool automatically provides a correct answer to the student.

As used herein the term "question" refers to statements phrased as questions and also to statements not phrased as questions. In either case, the statement will preferably be phrased so that at least one particular response to the statement can be determined to be a correct response. The term "answer" as used herein refers to responses to the statement, regardless of whether the statement is phrased as a question.

The present invention can be implemented in an on-line educational learning center. The learning center may provide on-line opportunities for students to enroll in educational courses pertaining to any number of different subject areas and to be tested on the information presented in the course. The exam questions that exist within the on-line learning center can be provided by the creator and host of the learning center, or can be provided by third parties (e.g. universities or vendors). A third party wishing to submit and create exam questions utilizing the interactive software tool of the present invention can access a learning center website, using a browser such as the HotJava browser from Sun Microsystems, Inc. of Palo Alto, Calif. or Netscape Navigator from Netscape Communications. The browser utilized, for the purposes of the embodiments illustrated herein, supports the JAVA language, so that the third party can provide exam questions to the on-line learning center. JAVA is a trademark and registered trademark of Sun Microsystems, Inc. in the United States and other countries. A JAVA software tool may guide the third party through the process of creating exam questions for an on-line course within the on-line learning center structure.

JAVA is an object-oriented, platform-independent computer programming language and environment suitable for writing programs that run over the Internet. As used herein, the term "software tool" refers to a computer program. Optionally, the software tool may be an applet and designed to be executed from within another program. A software tool may be a small, specialized application written in the JAVA programming language that can be included in an HTML or XML page, much in the same way an image is included and can be executed in a Web browser. Software tools allow developers to add "interactive" content to Web documents (such as animation, page adornments, games, etc). Software tools can be downloaded from a Web server and executed within a JAVA-compatible browser (e.g. HotJava) by copying code from the Web server to a client. JAVA source code files (i.e. files with a java extension) are compiled by a JAVA compiler to produce instructions into a format called bytecode (i.e. files with a class extension), which can then be executed by a JAVA virtual machine (VM). JAVA VM's are available for different platforms and thus, help to provide "platform independence" for JAVA programs.

To run a JAVA software tool from a Web site, the site developer inserts software tool tags (i.e. <software tool> into an HTML document, an XML document or the code of some type of page description language, which instruct the browser to download the appropriate classes from the Web server and then interpret the classes. "Classes" define objects, as well as the behavior and attributes of the objects. Specifically, the tag identifies the JAVA classes needed for running the software tool and may also set parameter values for the software tool.

The illustrative embodiment of the present invention is described relative to a software tool in the JAVA programming language. However, the present invention is not limited to the specific embodiment. It should be noted that other languages can have different forms of a program that perform the same function, and the present invention can be used in a programming environment other than JAVA. Furthermore, the present invention is not specifically limited to a JAVA software tool executed from a Web browser, and may be implemented as various types of code modules in accordance with the teachings of the present invention.

FIG. 1 illustrates a block diagram of a network 100 suitable for implementing an on-line educational course and running the image-drag-drop software tool of the illustrative embodiment of the present invention. The network 100 includes a Web server 101 and a plurality of client machines 102 connected to the server 101 and running a JAVA-enabled Web browser 103. The Web server 101 and the client machines 102 are connected to a network 100 via communications links 104. The Web server 101 includes a database 105, servlets 106, and Web pages 107 generated by the servlets 104. The Web browsers 103 on the client machines 102 display Web pages. The Web browsers each include an HTML interpreter 108.

Figure 2:
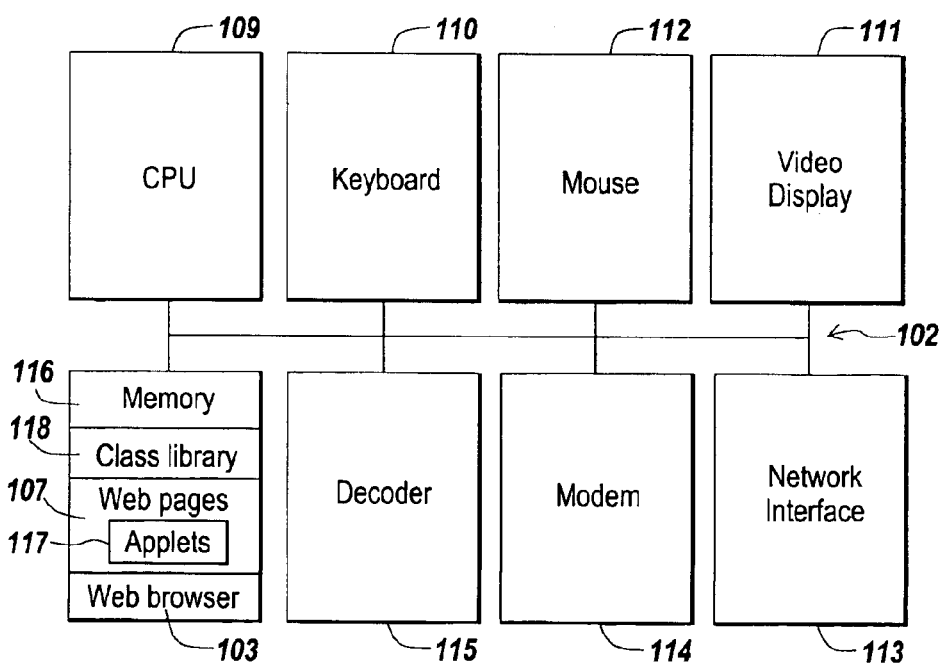
FIG. 2 is a block diagram of a client machine suitable for implementing the illustrative embodiment of the present invention.
Figure 5:
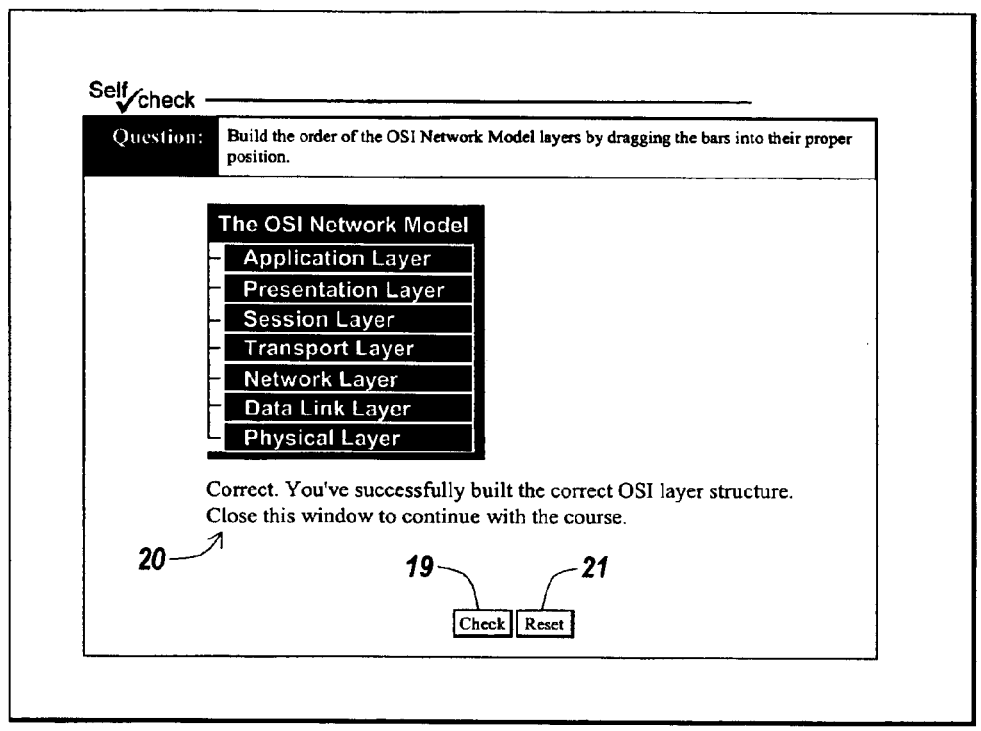
FIG. 5 illustrates an example of the user interface after the user has correctly matched each image in a set of images with a corresponding description.

FIG. 2 shows the client machine 102 of FIG. 1 in more detail. The client machine 102 includes a central processing unit 109, a keyboard 110 enabling a user to enter data into the client machine, a video display screen 111 and a mouse 112 or other pointing device for controlling the movement of a cursor or pointer on the display screen 111. The client machine 102 further optionally comprises a network interface 113 for connecting the client machine 102 to the Internet, a modem 114 for formatting data to be transmitted over telephone lines, coaxial cable, or other communication lines, a decoder 115 for translating encoded data to its original format and client memory 116. The memory 116 contains Web pages 107 including embedded software tools 117, a JAVA-enabled Web browser 103, and a JAVA class library containing the JAVA classes needed to run the software tools.

The client machine 102 can be a personal computer, a workstation, an Internet appliance, a personal digital assistant, a cell phone, a set-top box with attached television, an intelligent pager or a wide variety of other items capable of communicating with a user.

To run the interactive image-drag-drop software tool of the illustrative embodiment of the present invention, the Web server 101 sends an HTML document with an embedded image-drag-drop software tool to a client machine 102 of the network 100. The HTML interpreter then interprets the HTML document. The Java VM in the Web browser executes the image-drag-drop software tool and displays a Graphical User Interface (GUI) on a display monitor of the client machine 102. The GUI, which will be described in detail with reference to FIGS. 3 through 8, displays a question to a user and includes a box where the user can select one or more answers to the question.

Figure 3:
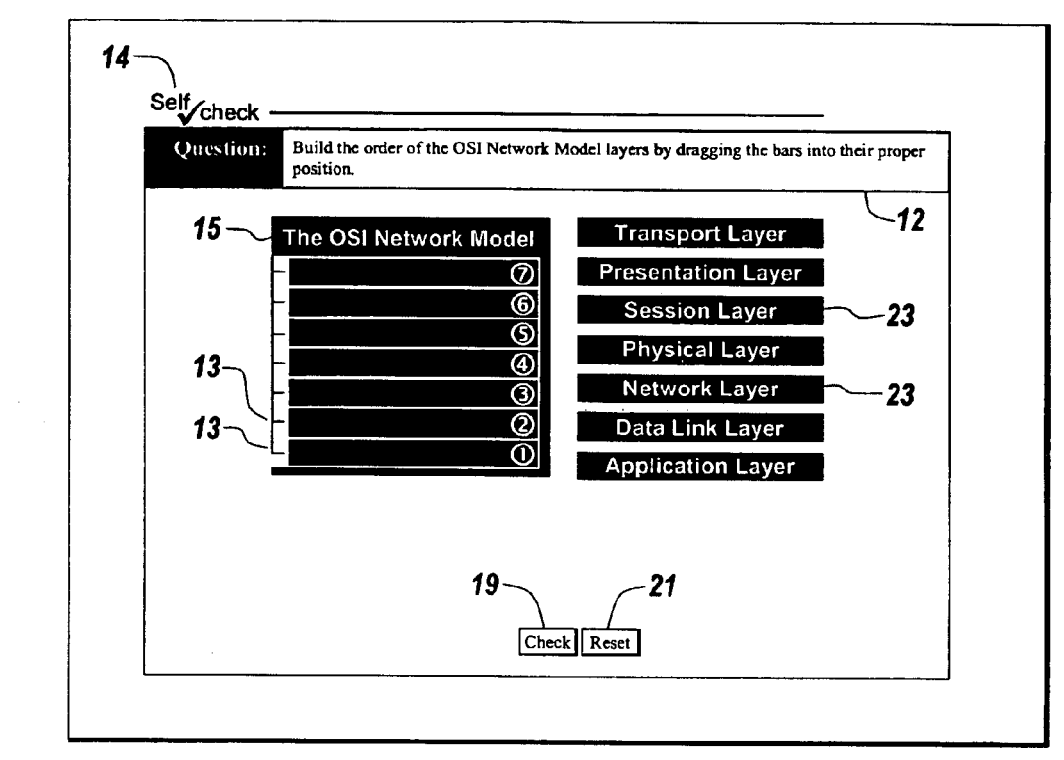

FIG. 3 illustrates a graphical user interface (GUI) 10 related to the image-drag-drop software tool according to an illustrative embodiment of the present invention. The illustrated image-drag-drop software tool tests a user regarding information presented in an on-line JAVA tutorial. In FIG. 3, a browser 11 illustrates the interactive image-drag-drop software tool. The GUI 10 of the illustrative image-drag-drop software tool displays question box 12 including a question related to information taught in an on-line course and instructions to the user.

Figure 4:
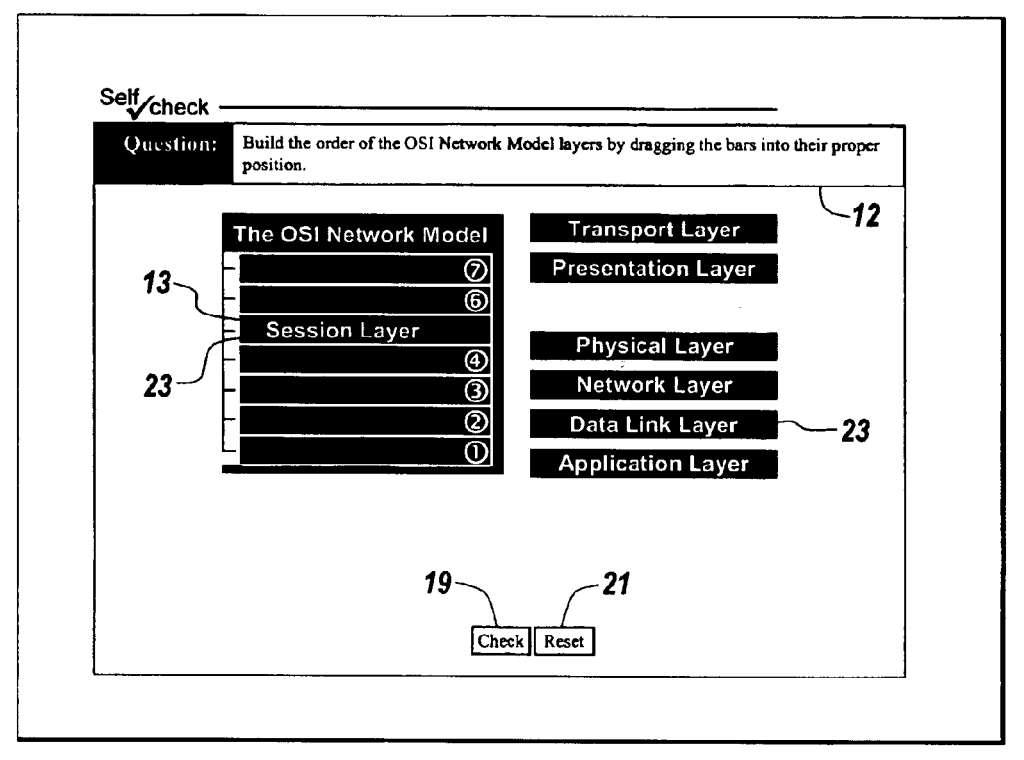

The GUI further includes a plurality of answer regions 13. Although each of the answer regions 13 is shown as approximately a square having lined borders, many variations of organization of answer regions are within the scope of the invention, including no borders and answers scattered randomly within the GUI or in a row and/or column format. The GUI further includes a plurality of answer selections 23. Each of the answer selections 23 corresponds to a specific answer region 13 in order to form a correct response to the question in the question box 12. The arrangement of the plurality of answer selections 23 is preferably random so as to increase the difficulty of forming a correct response to the question. The user forms a response to the question by clicking on each one of the answer selections 23 and dragging the answer selection 23 to the proper answer region 13. Dragging is typically performed by maintaining pressure on a mouse button while moving the mouse so as to align the answer selection 23 over at least part of the desired answer region 13. However, "dragging" as used herein is not limited to such a procedure and includes other methods of activating a particular region of the GUI and indicating a new location for which the representative portion of the GUI is to be moved. As shown in FIG. 4, one of the answer selections 23 has been moved to an answer region 13.

Optionally, the user may move an answer selection 23 among the available answer regions 13. Each answer region 13 can only accommodate a single answer selection 23. Therefore, two answer selections 23 may not be inserted into a single answer region 13. Optionally, a label 15 may be provided to further identify the relation of the answer regions 13 to the question.

The GUI includes function buttons 19, 21 to facilitate interaction with the user. When a user clicks on a function button, the software tool responds according to particular instructions stored in a software tool file.

In the GUI illustrated in FIG. 3, an HTML document provides an envelope for the image-drag-drop software tool (i.e. the software tool is embedded within the HTML document). The HTML document includes the static background for the software tool, including the instructions and/or question to the user. For example, the HTML document optionally includes a logo 14 and the question box 12.

The user proceeds to match each answer selection 23 with a corresponding answer region 13. The user completes the matching and presses the "check" button 19 to assess his selections. The software tool judges the arrangement of the answer selections 23 and answer regions 13 by the user and provides feedback to the user as shown, for example, in FIG. 5. If the user has correctly matched each image with a corresponding description, the software tool provides positive feedback in feedback site 20 to the user. According to the illustrative embodiment, the positive feedback in response to a correct match reads "Correct. You've successfully built the correct OSI layer structure. Close this window to continue with the course." According to the illustrative embodiment, the software tool is contained in a "pop-up" web page that is accessed at a particular point in the on-line course, such as after the user finishes a lesson. After the user completes the activity, the software tool directs the user back to the on-line course.

Figure 7:
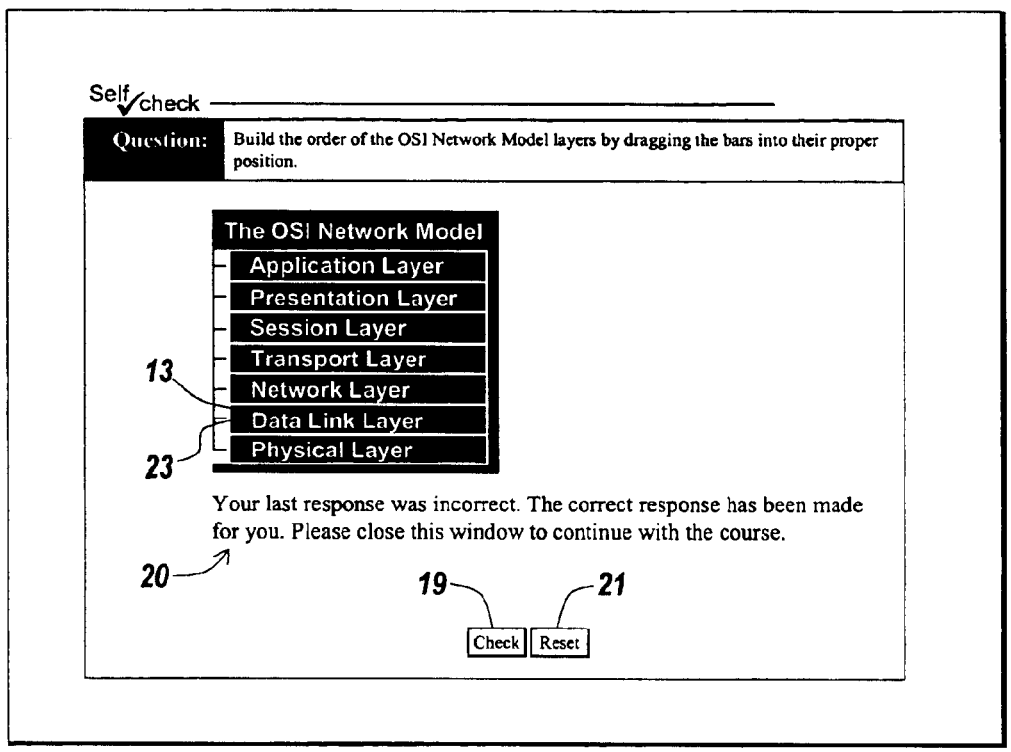
FIG. 7 illustrates an example of the user interface after the user has made the maximum attempts allowed to match the images with the corresponding descriptions.

However, if one or more of the associations made by the user is wrong, the software tool provides a negative feedback in the feedback site 20 and prompts the user to try again, as illustrated in FIG. 6. In the illustrative embodiment the negative feedback is "Incorrect. Please reconfigure your selections. 2 are correct." According to the illustrative embodiment, the invention informs the user of the number of selections that are correct. A "reset" button 21 is included to allow the user to clear his selections. After a predetermined number of failed attempts, the software tool automatically provides the correct answer to the user, as illustrated in FIG. 7. According to the illustrative embodiment, the correct response to the question is provided by the image-drag-drop software tool and comprises a proper association of answer selections 23 and answer regions 13. According to the illustrative embodiment, after three attempts, the software tool notifies the user, "Your last response was incorrect. The correct response has been made for you. Please close this window to continue with the course." The software tool also disables the function buttons 19, 21 to prevent the user from subsequent action.

Figure 8:
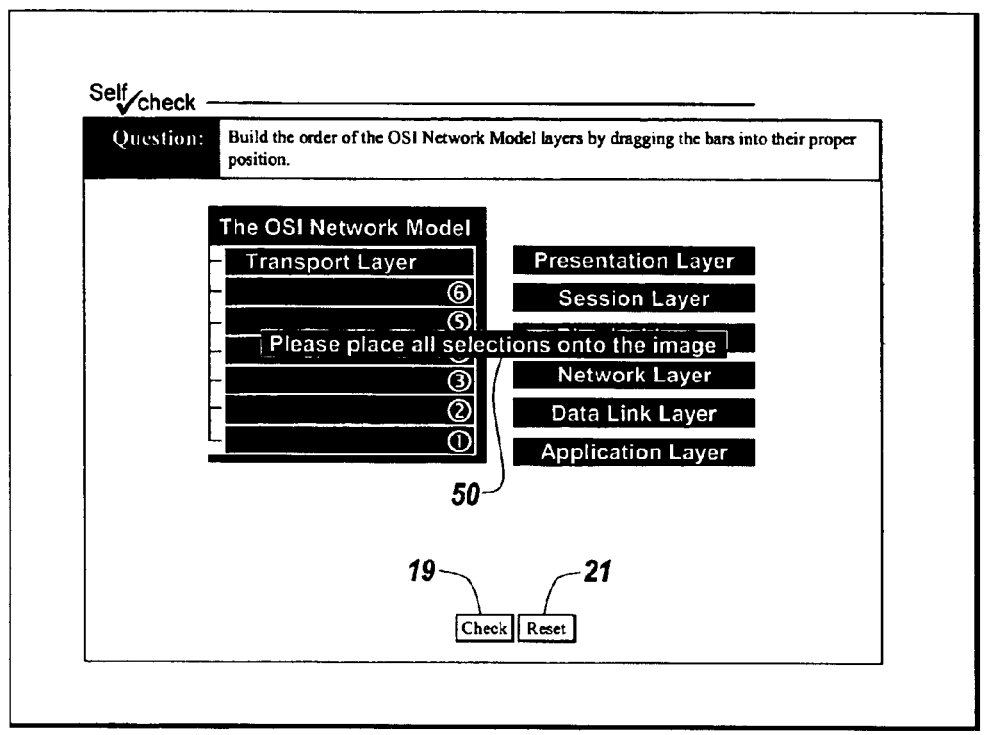
FIG. 8 illustrates an example of the user interface after the user has provided an incomplete answer.

According to one embodiment, shown in FIG. 8, the software tool further provides feedback 50 to the user regarding an incomplete answer. If the user fails to enter a selection and then presses the "check" button 19, the software tool responds "Please place all selections onto the image" or other similar command in the feedback site 20.

According to another embodiment, the software tool randomizes the order of the answer selections 23 upon subsequent re-loading of the software tool.

According to the illustrative embodiment of the present invention, the image-drag-drop software tool is embedded in a page within the on-line course. The page is an HTML, XML, or other page description language document including a link to the software tool. An HTML file is a hypertext markup language file conventionally used in creating documents on the World Wide Web or Internet. HTML defines the layout and structure of the file, using various tags and attributes. As discussed, the HTML file used in conjunction with the image-drag-drop software tool of the present invention can include exam questions and reference the JAVAn image-drag-drop software tool that presents a question to the student, and then checks the answers.

An example of an HTML fragment suitable for the illustrative case includes the following code:

Navigator. The questions can be viewed by any user running the HTML code, using a browser to look at the source code. Generally, a user can easily view the source code for a web page by positioning a mouse pointer on the web page and clicking on the right button of the mouse. Therefore, according to the present invention, the answers to the question are

```
<html>
<body bgcolor="#ffffff" topmargin="0" leftmargin="0" marginwidth="0"
marginheight="0">
<table align="center" cellspacing="5" cellpadding="0" border="0">
<tr>
    <td>
<table cellspacing="0" cellpadding="0" border="0">
<tr>
    <td><img src="../../../self-check-title.gif" align="left"></td>
</tr>
</table>
<div align="center">
<table width="98%" border="0" cellspacing="0" cellpadding="1"
bgcolor="#000000">
    <tr>
        <td>
            <table border="0" cellspacing="0" cellpadding="1" width="100%">
                <tr>
                    <td height="22">
                        <table width="100%" border="0" cellspacing="0"
cellpadding="5" bgcolor="#FFFFFF">
                            <tr>
                                <td width="17%" valign="top" bgcolor="#000000"
align="center"><b><font color="#FFFFCC">Question:</font></b></td>
                                <td width="83%" bgcolor="#e4e4e4">Build the order of
the OSI Network Model layers by dragging the bars into their proper
position. </td>
                            </tr>
                        </table>
                    </td>
                </tr>
                <tr bgcolor="#FFFFFF">
                    <td height="22">
                        <table width="100%" border="0" cellspacing="0"
cellpadding="1">
                            <tr><td>  </td ></tr>
                                <tr>
                                    <td>
                                        <div align="center">
                                        <software tool
archive="../../../SESTBTInteractivity.jar" code="ImageDragDrop"
width="450" height="375">
                                            <param name="file" value="imagedragdrop.def">
                                            <param name="TBTServletBase" value=".">
                                            <param name="TBTDocumentBase" value="">
                                        </software tool>
                                        </div>
                                    </td>
                                </tr>
                        </table>
                    </td>
                </tr>
            </table>
        </td>
    </tr>
</table>
</div>
            </td>
</tr>
</table>
</body>
</html>
```

This code defines the attributes of the HTML document wherein the image-drag-drop software tool is embedded. Tag <td width="83%" bgcolor="#e4e4e4"> of the code precedes the question and instructions to the user displayed in question box 12 in FIG. 3. The HTML code can be run with the help of a browser such as HotJava or Netscape typically included in a separate file and are not generally available to the user.

The HTML code further includes a software tool tag. The software tool tag instructs the browser to load a software tool having the attributes defined by the tag. The browser calls an image-drag-drop software tool of an illustrative embodiment of the present invention with the following software tool tag HTML code:

```
<software tool codebase="<prop servletname>content:/
  java/" archive="SESTBTInteractivity.jar" code=
  "ImageDragDrop" width="500" height="450"><param
  name="file" value="imagedragdrop.def"><param name=
  "TBTServletBase" value="<prop servletname>"><param
  name="TBTDocumentBase" value="<subst
  contentPageDocBase>"></software tool>
```

The browser loads the software tool class files for the image-drag-drop software tool into a JAVA interpreter and calls a definition file defined by the software tool tag and corresponding to the image-drag-drop software tool. The tag tells the software tool viewer or browser to load the software tool whose compiled code is in the file "ImageDragDrop" and sets the initial size of the software tool to 500 pixels in length and 450 pixels in height. The "codebase" parameter specifies the base URL of the software tool (the directory that contains the software tool's code). The "archive" parameter of the tag describes one or more archives containing classes and other resources for the image-drag-drop software tool. The jar files referenced in the archive are compressed versions of JAVA files, suitable for transporting over a network, such as the Internet. The "param name" parameters specify a software tool-specific attribute. The first param name invokes a definition file for the image-drag-drop software tool. The second param name parameter, TBTServletBase, specifies the server for the software tool and the parameter TBTDocumentBase specifies the directory containing the SESTBTInteractivity.jar file.

The JAVA definition file written for the image-drag-drop software tool of the present invention includes the answers and other parameters of the software tool, which are hidden from the user. The software tool tag directs the browser to the definition file "imagedragdrop.def" stored on the server. The definition file defines the appearance of the software tool and includes a number of attribute tags. For example, a definition file for the image-drag-drop software tool of the illustrative embodiment the present invention may include the following code, which is illustrative of one embodiment of the invention and is not to be construed in a limiting sense:

```
@bgcolor
white
@numberofimages
7
@orientation
right
@bgimage
back2.gif
@image
tra.gif
15
109
202
23
@image
pres. gif
15
59
202
23
@image
ses.gif
15
84
202
23
@image
phy.gif
15
185
202
23
@image
net.gif
15
134
202
23
@image
data. gif
15
160
202
23
@image
app.gif
15
35
202
23
@correctfeedback
Correct. You've successfully built the OSI layer structure.
Close this window to continue with the course.
@incorrectfeedback
Incorrect. Please reconfigure your selections.
```

The definition file tags define particular parameters the software tool. In the example set forth above, "bgcolor" defines the color to be displayed as a background. As defined by the illustrative definition file of the image-drag-drop software tool, the background color is set to white. The "numberofimages" tag defines the number of answer selections to be dragged into answer regions. The tag "orientation" determines where the answer selections are arranged. For example, in the illustrated embodiment, the orientation tag is provided with a value of "right". Therefore, the answer selections are arranged along a right side as shown in FIG. 3. The tag "bgimage" defines the file name of an image that may be set as a background image. Preferably, the background image file will be a .gif file, but may be a wide variety of other image formats. The "image" tag related to each of the answer selections and is provided with five values. The first value, for example "tra.gif" in the illustrated example is the file name of the file related to a first answer selection. The second and third values define the x and y positions, respectively, for placement of the image file. The fourth and fifth values define the width and height, respectively, of the correct position of the answer selection file. According to an embodiment of the invention, the number of answer selections will correspond to the value for the tag "numberofimages" and an "image" tag will be provided for each of the answer selections. The tag "correctfeedback" defines the feedback to be given to the user if all of the images have been correctly connected with a corresponding description. Finally, the tag "incorrectfeedback" defines the feedback to be given to the user if the user has incorrectly matched the images and the descriptions.

The definition file may further include a tag defining the maximum number of attempts a student can make before the software tool automatically provides the correct answer. In general, an exam may include a several questions, and the maximum number of attempts defined by the software tool can vary according to the difficulty of each question. For example, an exam may include two questions, the first of which may be deemed by the administrator to be easier than the second. In such a case, the maximum attempts may be set to a smaller number for the first question than the second question. This provides the student more opportunities to obtain the right answer for the second, more difficult question.

One advantage to providing the answers to the exam question in a separate file, instead of the HTML source file that references the JAVA software tool, is that a user cannot cheat by looking for the answers to a question in the source file, which is usually freely readable. Second, the JAVA software tool requires the correct answer, to check whether or not a student's reply is accurate, but does not require the question. Thus, it is convenient to utilize a separate file as input to the JAVA software tool that contains answers but no questions. The definition file can be altered, and subsequently used by the JAVA software tool, without having to recompile or rejar the software tool. Hence, the use of a definition file facilitates the introduction of new questions and the correction of errors. For example, after the software tool executes, it may become evident that there is an error, such as a misspelled word in a message provided to the student. The misspelled word can be modified directly in the definition file, and the JAVA code run again, without having to recompile and/or rejar the software tool.

Figure 9:
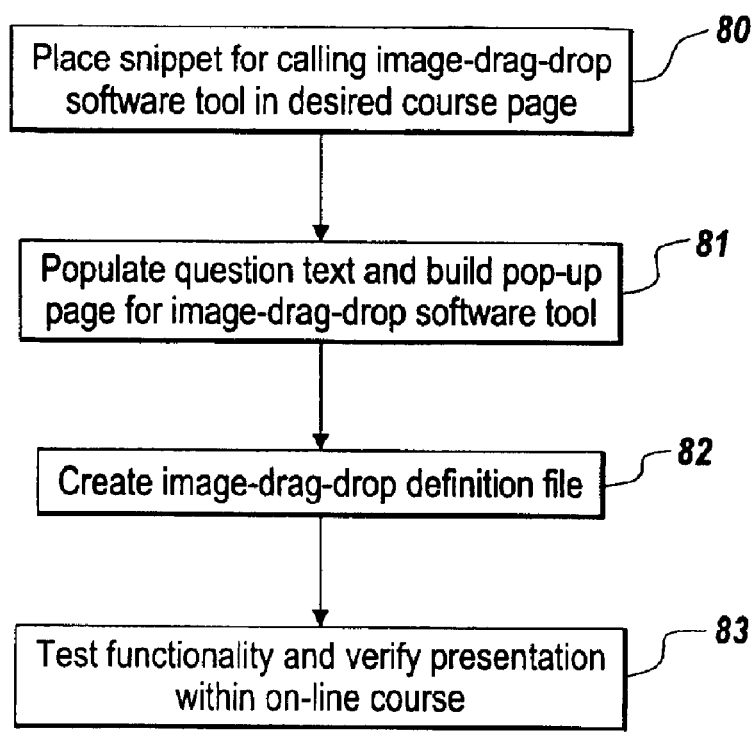
FIG. 9 is a flow chart illustrating the steps involved in creating the image-drag-drop software tool according to an illustrative embodiment of the present invention.

FIG. 9 illustrates the steps involved for an on-line educational course developer to create the image-drag-drop software tool of the illustrative embodiment of the present invention. At some point in the educational course, the developer may include the image-drag-drop software tool of the present invention to test the user's knowledge of the presented material. First, in step 80, the developer embeds a snippet in a course page of the on-line educational course for calling the image-drag-drop software tool. The snippet directs the browser and the user to an HTML document containing the image-drag-drop software tool. For example, a suitable code fragment in a course page for calling a pop-up HTML page containing the software tool according to the teachings of the present inventions is as follows:

```
<a href="HOTTEXT?DialogURL=self-check/self-
check.html&DialogWidth=640&DialogHeight=480&DialogTitle=Self-
Check&pgtype=framehottext"><img alt=self-check border=0
src="content:/images/self-check.gif"></a>
```

The above code allows a user to launch a pop-up page containing an examination question. The pop-up page of the illustrative embodiment has a width of 640 pixels and a height of 480 pixels.

Next, in step 81, the developer populates the question text and builds the pop-up page for the software tool. The pop-up page coding includes the above-described software tool tag or another suitable tag for executing an image-drag-drop software tool according to the teachings of the present invention. According to a preferred practice of the invention of the invention, the developer sets the width dimension of software tool in the software tool tag such that the function buttons (i.e. the check button and the reset button) are visible.

The developer creates an image-drag-drop definition file in step 82, including the desired parameters and tags, as described above. Finally, in step 83, the developer tests the functionality and desired presentation of the image-drag-drop software tool within an on-line educational course.

To implement the image-drag-drop software tool of the present invention, the image-drag-drop software tool includes computer executable instructions stored on a computer readable medium. The medium can include, for example, a hard disk, RAM medium, diskette, CD-ROM or other optical or magnetic storage medium. The instructions can be stored on a server that can be remote from the user. To run the application, the user can download the instructions to a computer readable medium of a local computer. The instructions can then be downloaded from the computer readable medium of the local computer to a local processor of the local computer, where the instructions are executed with the help of a virtual machine. A graphical user interface is generated by the instructions for displaying a question and a text field. The interface allows a user to enter an answer to the question in the text field.

Although many of the foregoing examples have highlighted the use of JAVA in the present invention, other computer languages executed by virtual machines may be utilized for this purpose. As known to those of ordinary skill in the art, a virtual machine is an abstract computing machine having an instruction set and being capable of manipulating various memory areas at run time. A well-known virtual machine is the P-Code machine of UCSD Pascal, and the JAVA virtual machine. The JAVA virtual machine does not assume any particular implementation technology, host hardware, or host operating system. It is not necessarily interpreted, and can be implemented by compiling its instruction set to that of a silicon processor. The JAVA virtual machine may also be implemented in microcode or directly in silicon.

These examples are meant to be illustrative and not limiting. The present invention has been described by way of example, and modifications and variations of the exemplary embodiments will suggest themselves to skilled artisans in this field without departing from the spirit of the invention. For example, the present invention is not limited to a JAVA software tool executed from a Web browser, and can include any program executed from another application. The described software tool is not limited to execution from a pop-up Web page and can be embedded in any suitable document code in any suitable programming language. Alternately, the question and/or instructions to the user can be part of a definition file for the software tool, rather than a part of a static background created by a Web page or other suitable document.

Features and characteristics of the above-described embodiments may be used in combination. This description is to be construed as illustrative only and is for the purpose of teaching those skilled in the art the best mode for carrying out the invention. The preferred embodiments are merely illustrative and should not be considered restrictive in any way. Details of the structure may vary substantially without departing from the spirit of the invention, and exclusive use of all modifications that come within the scope of the appended claims is reserved. It is intended that the invention be limited only to the extent required by the appended claims and the applicable rules of law. The scope of the invention is to be measured by the appended claims, rather than the preceding description, and all variations and equivalents that fall within the range of the claims are intended to be embraced therein.

What is claimed is:

1. In an electronic device that provides an on-line educational course, a method comprising:

providing an interactive image-drag-drop software tool, wherein the software tool generates a graphical user interface displaying a question, a plurality of answer selections and a plurality of answer regions to a user to allow the user to drag each answer selection of the plurality of answer selections to a unique answer region of the plurality of answer regions; and forwarding the image-drag-drop software tool from the electronic device to a remote client.

2. The method of claim 1, wherein the image-drag-drop software tool provides feedback to the user indicating whether the dragging of each answer selection of the plurality of answer selections to answer regions by the user is a correct reply to the question.

3. The method of claim 1, wherein the image-drag-drop software tool permits a predetermined number of attempts by the user to correctly drag each answer selection of the plurality of answer selections to answer regions.

4. The method of claim 3, wherein the image-drag-drop software tool automatically provides an arrangement of the answer selections in the answer regions after the user surpasses the predetermined number of attempts.

5. The method of claim 4, wherein the image-drag-drop software tool prevents the user from dragging an answer selection after the predetermined number of attempts.

6. The method of claim 1, wherein the image-drag-drop software tool is an applet.

7. In an electronic device that provides an on-line educational course, a method comprising:

receiving a request for a Web page at the electronic device from a remote client; and in response to the receiving step, sending a Web page containing a question and an image-drag-drop software tool embedded therein to the remote client, wherein the image-drag-drop software tool generates a graphical user interface (GUI) including instructions to a user to enter a correct response to the question provided by the Web page, the graphical user interface displaying a question, a plurality of answer selections and a plurality of answer regions to a user to allow the user to drag each answer selection of the plurality of answer selections to a unique answer region of the plurality of answer regions.

8. The method of claim 7, wherein the Web page comprises a page of an on-line educational course.

9. The method of claim 7, wherein the Web page includes a software tool tag instructing a browser to execute instructions for running the image-drag-drop software tool.

10. The method of claim 7, wherein the image-drag-drop software tool includes a definition file defining a correct answer to the question.

11. The method of claim 10, wherein the definition file is separate from a source code for the Web page to prevent a user from obtaining the correct answer by viewing the source code.

12. The method of claim 7, wherein the image-drag-drop software tool is an applet.

13. A computer-readable medium for use in an electronic device that provides an on-line educational course, comprising instructions for running an image-drag-drop software tool for displaying a question, a plurality of answer selections and a plurality of answer regions to a user to allow the user to drag each answer selection of the plurality of answer selections to a unique answer region of the plurality of answer regions to form a proper response to the question.

14. The computer-readable medium of claim 13, wherein the instructions are executable on a virtual machine.

15. The computer-readable medium of claim 13, wherein the instructions are stored on a server and downloaded to a local processor of the user.

16. The computer-readable medium of claim 13, wherein the medium includes hypertext markup language (HTML) code to reference the software tool.

17. The computer-readable medium of claim 16, wherein the HTML code includes the question.

18. The computer-readable medium of claim 17, further comprising a definition file indicating a correct answer for the question, the definition file being separate from the HTML code to prevent the user from obtaining the correct answer by looking at the HTML code.

19. The computer-readable medium of claim 13, wherein the image-drag-drop software tool is an applet.

20. An electronic device for providing an on-line educational course comprising a processor;

a display screen; and memory including a Web page having an interactive image-drag-drop software tool embedded therein, wherein the processor executes the image-drag-drop software tool to generate at least a portion of a graphical user interface on the display screen, the graphical user interface displaying a question, a plurality of answer selections and a plurality of answer regions to a user to allow the user to drag each answer selection of the plurality of answer selections to a unique answer region of the plurality of answer regions to form a proper response to the question.

21. The electronic device of claim 20, further comprising a browser for locating and displaying the Web page.

22. The electronic device of claim 21, further comprising a network connection for connecting the electronic device to a computer network.

23. The electronic device of claim 20, further comprising input media to allow the user to form the proper response to the question.

24. The computer-readable medium of claim 20, wherein the image-drag-drop software tool is an applet.

* * * * *